United States Patent [19]

Maucher

[11] Patent Number: 4,684,007

[45] Date of Patent: Aug. 4, 1987

[54] CLUTCH PLATE

[75] Inventor: Edmund Maucher, Wooster, Ohio

[73] Assignee: Luk Lamellen und Kupplungsbau GmbH, Bühl, Fed. Rep. of Germany

[21] Appl. No.: 485,615

[22] Filed: Apr. 18, 1983

[51] Int. Cl.[4] .......................... F16D 3/14; F16D 3/66
[52] U.S. Cl. .............................. 192/106.2; 192/70.17; 464/68
[58] Field of Search .......................... 192/106.2, 70.17; 464/68, 66, 62

[56] References Cited

U.S. PATENT DOCUMENTS

| 2,097,627 | 11/1937 | Lewis | 464/68 |
|---|---|---|---|
| 2,513,379 | 7/1950 | Thelander | 464/68 |
| 2,571,291 | 10/1951 | Reed | 464/68 |
| 3,138,011 | 6/1964 | Stromberg | 464/68 |
| 3,138,039 | 6/1964 | Zeidler et al. | 192/106.2 |
| 3,266,271 | 8/1966 | Stromberg | 192/106.2 |
| 3,931,876 | 1/1976 | Beeskow et al. | 192/106.2 |
| 4,139,995 | 2/1979 | Lamarche | 192/106.2 |
| 4,239,097 | 12/1980 | Greacen et al. | 192/106.2 |
| 4,562,912 | 1/1986 | Kabayama | 192/106.2 |

FOREIGN PATENT DOCUMENTS

| 69458 | 1/1983 | European Pat. Off. | 192/106.2 |
|---|---|---|---|
| 3205039 | 8/1982 | Fed. Rep. of Germany | |
| 1289560 | 2/1962 | France | 464/68 |
| 56-147926 | 11/1981 | Japan | 192/106.2 |
| 134019 | 8/1982 | Japan | 192/106.2 |
| 2083166 | 3/1982 | United Kingdom | 464/68 |
| 2089472 | 6/1982 | United Kingdom | 464/68 |
| 2093564 | 9/1982 | United Kingdom | 464/68 |

Primary Examiner—Rodney H. Bonck
Assistant Examiner—Richard M. Lorence
Attorney, Agent, or Firm—Peter K. Kontler

[57] ABSTRACT

A clutch plate for use in friction clutches of automotive vehicles has three units which are angularly movable with reference to one another, and two sets of coil springs. The first unit has two rigidly connected spaced-apart disc members one of which carries the friction linings and can be driven by the flywheel of the engine. The second unit has a hub which can drive the input shaft of a change-speed transmission and a flange consisting of three radially outwardly extending arms which are rigid with the hub and disposed in pockets defined by two mirror symmetrical intermediate discs constituting the third unit. The intermediate discs are disposed between the disc members of the first unit and have peripheral notches for distancing elements which connect the disc members to one another and can perform limited angular movements in their notches. The intermediate discs extend radially beyond the arms of the flange and have projections which extend, with angular play, between the arms of the flange. One set of coil springs is installed in registering openings of the arms and intermediate discs to oppose relative angular movement between the second and third units, and the other set of springs is installed in registering windows of the disc members and intermediate discs to oppose angular movements of the first and third units with reference to one another. Friction generating devices are interposed between the first and second, first and third and/or second and third units.

33 Claims, 3 Drawing Figures

CLUTCH PLATE

BACKGROUND OF THE INVENTION

The present invention relates to friction clutches in general, and more particularly to improvements in clutch plates for use in friction clutches, especially in friction clutches of automotive vehicles. Still more particularly, the invention relates to improvements in clutch plates of the type wherein a first unit carries one or more friction linings which can be clamped between two pressure plates of the friction clutch and is angularly movable, within limits, relative to a second unit having a hub adapted to be connected to the input shaft of a change-speed transmission in an automotive vehicle. In such clutch plates, the first unit normally comprises a pair of disc members which surround the hub of the second unit and are rigidly connected to each other in axially spaced positions, and the hub of the second unit has a radially outwardly extending flange which is disposed between the disc members of the first unit.

As disclosed in German Offenlegungsschrift No. 3,205,039, a clutch plate can further comprise a third unit including two coaxial and rigidly interconnected intermediate discs which are disposed between the disc members of the first unit and flank the flange of the hub. The third unit is angularly movable with reference to the first and second units. Such angular movability of the three units with reference to each other is limited by a main damping unit for operation under load and by an auxiliary or idling damping unit for operation in the idling range.

The clutch plate of the aforementioned German printed publication further comprises a second flange which is secured to the flange of the hub and carries the intermediate discs of the third unit. The intermediate discs are disposed at the opposite sides of the second flange. A drawback of the just described clutch plate is that the combined weight of its constituents is quite pronounced, mainly or particularly due to the provision of the heavy second flange. This results in the generation of more pronounced stresses when the clutch plate is driven by the flywheel of an internal combustion engine. The bulk and weight of the clutch plate contribute to pronounced wear upon and rapidly affect the synchronization of the transmission which receives torque from the clutch plate. Moreover, the just described clutch plate comprises a substantial number of discrete parts which contributes to the initial and maintenance cost of the clutch embodying the clutch plate. Still further, the just discussed clutch plate does not allow for the selection of a wide variety of idling damping devices which normally comprise weak and small torsion springs.

OBJECTS AND SUMMARY OF THE INVENTION

An object of the invention is to provide a clutch plate which is particularly suited for use in friction clutches of automotive vehicles and which is not only simpler and less expensive but also more reliable than heretofore known clutch plates.

Another object of the invention is to provide a clutch plate which comprises a small number or relatively simple parts.

A further object of the invention is to provide a clutch plate whose weight is a fraction of the weight of conventional clutch plates.

An additional object of the invention is to provide a clutch plate whose useful life is longer than that of heretofore known clutch plates.

Still another object of the invention is to provide the clutch plate with novel and improved means for confining the main and the auxiliary damping means.

An additional object of the invention is to provide a clutch plate which can be used in existing friction clutches as a superior substitute for heretofore known clutch plates.

An ancillary object of the invention is to provide the clutch plate with novel and improved means for limiting the extent of angular movements of various units with reference to one another.

An additional object of the invention is to provide a clutch plate wherein the weight of the third unit and/or of the means for supporting the third unit is a fraction of the weight of corresponding parts in conventional clutch plates.

Another object of the invention is to provide a novel and improved method of assembling various units of a clutch plate for use in friction clutches of automotive vehicles or the like.

An additional object of the invention is to provide a novel and improved distribution of the components of the main and idling damping means in a clutch plate of the above outlined character.

The invention is embodied in a clutch plate which can be used with particular advantage in friction clutches of automotive vehicles. The clutch plate comprises a first unit including spaced-apart coaxial rigidly interconnected first and second disc members and friction linings provided on at least one disc member, a second unit including a hub having an external flange which is disposed between the disc members of the first unit, and a third unit including first and second metallic intermediate discs flanking the flange of the second unit, disposed between the disc members of the first unit, non-rotatably connected to one another and having marginal portions extending radially outwardly well beyond the flange. The units are assembled in such a way that they can perform limited angular movements with reference to one another, and the clutch plate further comprises main damping means for yieldably opposing the angular movements of the first and third units with reference to one another as well as idling damping means for yieldably opposing angular movements of the second and third units with reference to one another. At least the major part of the main damping means is disposed radially outwardly of the flange and such damping means extends into registering windows which are provided therefor in the disc members of the first unit as well as in the intermediate discs of the third unit. The idling damping means extends into registering openings which are provided therefor in the flange of the hub and in the intermediate discs of the third unit.

The flange preferably comprises a plurality of preferably similar or identical arms (preferably three arms which are equidistant from one another, as considered in the circumferential direction of the hub), and the openings for the idling damping means are provided in the arms of the flange.

At least one of the intermediate discs is preferably provided with projections which extend axially of the clutch plate and with play into the recesses between the neighboring arms of the flange to thus allow for the aforementioned limited angular movements of the second and third units with reference to one another. The edge faces of the arms which flank the projections of the one intermediate disc can engage the adjacent edge faces of such projections in response to clockwise or counterclockwise rotation of the second unit relative to the third unit and/or vice versa. In accordance with a presently preferred embodiment of the invention, each of the two intermediate discs has axially extending projections which are received between the neighboring arms of the flange. The projections of one intermediate disc preferably register with the projections of the other intermediate disc. The arrangement is preferably such that the projections of the one intermediate disc extend axially toward the projections of the other intermediate disc and vice versa, and at least one projection of the one intermediate disc is rigidly secured to the registering projection of the other intermediate disc by a rivet or other suitable connecting means. The projections of the one intermediate disc preferably abut the registering projections of the other intermediate disc. At least a portion of the flange is preferably confined between the two intermediate discs of the third unit.

The aforementioned marginal portions of the intermediate discs preferably extend toward each other in the axial direction of the clutch plate; such marginal portions preferably abut against each other and are preferably secured to one another by one or more rivets or other suitable connecting means. The two intermediate discs are preferably mirror symmetrical to one another with reference to a plane which is normal to the axis of the hub and extends between the intermediate discs. The intermediate discs preferably define pockets for the arms of the flange; such pockets alternate with the aforediscussed projections of the one and/or the other intermediate disc.

The clutch plate preferably further comprises a first friction generating device which is interposed between the second and third units and comprises at least one first bearing element which extends circumferentially of the hub and is disposed between the second and third units. A second friction generating device is preferably installed between the first and third units and preferably comprises a second bearing element which extends circumferentially of the hub and is disposed between the first and third units. The first bearing element is preferably identical with the second bearing element. A third friction generating device can be interposed between the first and second units.

The means for rigidly connecting the disc members of the first unit preferably comprises axially parallel distancing elements, and the third unit is preferably provided with notches which receive such distancing elements with a certain amount of play, as considered in the circumferential direction of the hub, to thus allow for the aforediscussed limited angular movement of the first and second units relative to one another. The notches are preferably provided in the marginal portions of the intermediate discs, and such intermediate discs have edge faces which are provided in the notches and move into abutment with the respective distancing elements in response to angular displacement of the first and third units relative to one another.

As mentioned above, the flange of the hub forming part of the second unit preferably comprises three equidistant arms, and the main damping means preferably comprises three pairs of coil springs each disposed radially outwardly of a different arm. Such parts of coil springs are preferably equidistant from one another, as considered in the circumferential direction of the hub. The idling damping means preferably comprises three coil springs which are equidistant from one another, as considered circumferentially of the hub, and each of which is disposed radially inwardly of a pair of coil springs forming part of the main damping means. The energy storing capacity of the coil springs which constitute or form part of the idling damping means is preferably less than the energy storing capacity of the springs which constitute or form part of the main damping means. The coil springs of each pair of coil springs forming part of the main damping means are preferably telescoped into one another.

The novel features which are considered as characteristic of the invention are set forth in particular in the appended claims. The improved clutch plate itself, however, both as to its construction and the mode of assembling the same, together with additional features and advantages thereof, will be best understood upon perusal of the following detailed description of certain specific embodiments with reference to the accompanying drawings.

DESCRIPTION OF THE PREFERRED EMBODIMENTS

Figure 1:
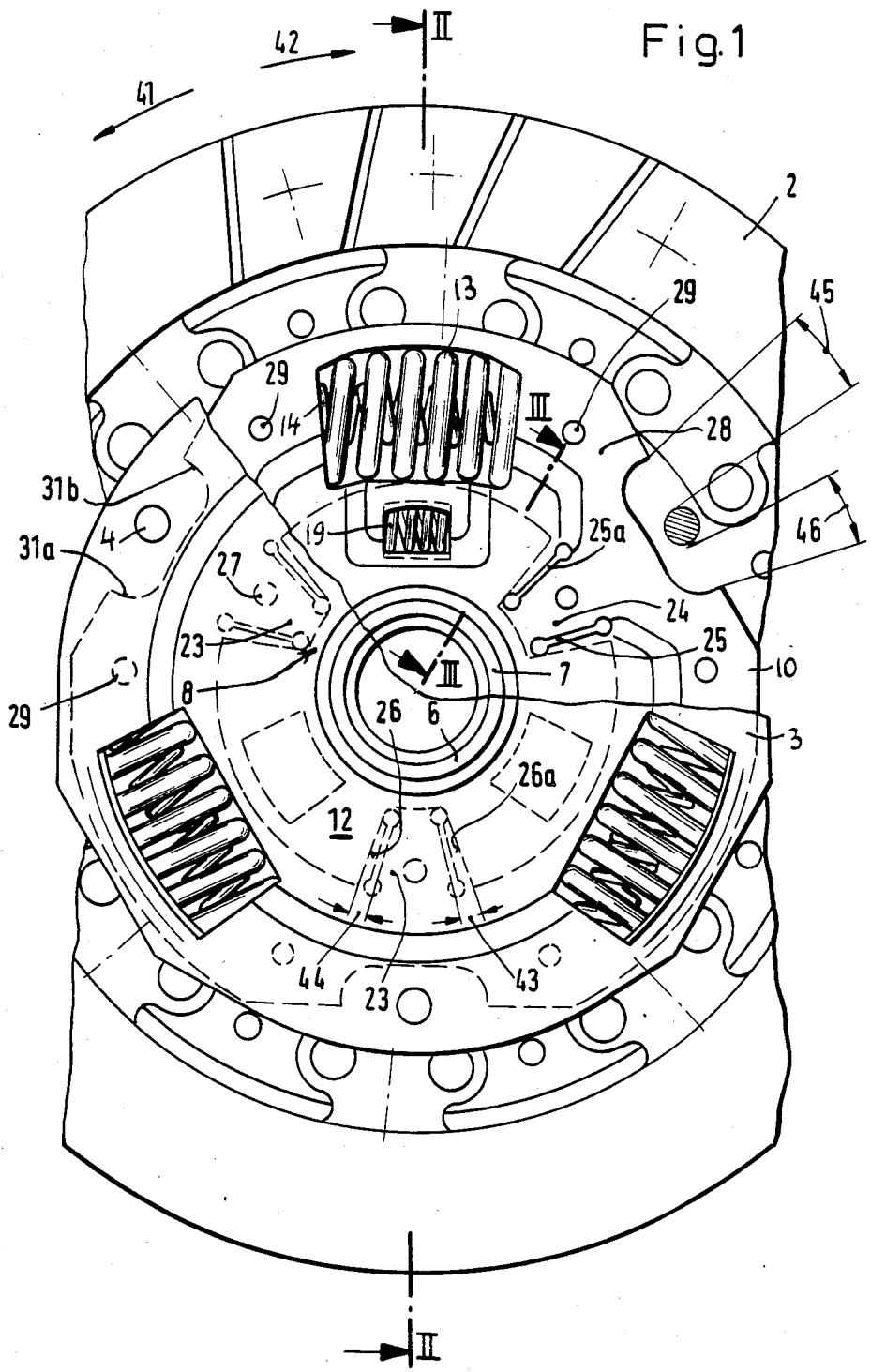
FIG. 1 is a fragmentary elevational view of a clutch plate which embodies the present invention, with a portion of one of the disc members broken away.

The drawing shows a clutch plate 1 which comprises a first or input unit 2 including two spaced-apart coaxial disc members 3 and 5 rigidly connected to each other by a set of axially parallel distancing elements in the form of rivets 4. The outer marginal portion of the disc member 3 supports two friction linings 3a which can be engaged by two pressure plates of a friction clutch in an automotive vehicle (not shown) so that the first unit 2 can transmit torque to a second or output unit 6. The unit 6 comprises an internally splined hub 7, which can be slipped onto the input shaft of a change-speed transmission in the automotive vehicle, and a composite flange 8 which extends radially outwardly from the hub and includes three equidistant, identically configured and identically dimensioned sections or arms 12. The arms 12 of the flange 8 are disposed between the disc members 3, 5 of the first unit 1. A third unit 9 of the clutch plate 1 is disposed between the units 2 and 6; this third unit comprises two intermediate discs 10, 11 which are mirror symmetrical to one another with reference to a plane extending at right angles to the axis of the hub 7 and disposed between the intermediate discs. Each of the intermediate discs 10, 11 can constitute a stamping made of a suitable metallic sheet stock. The intermediate discs 10, 11 are rigidly connected to each other, and they extend radially well beyond the arms 12 of the flange 8. It will be noted that the discs 10, 11 confine the arms 12 and are disposed between the disc members 3, 5 of the first unit 2.

The three arms 12 of the flange 8 of the second unit 6 are disposed in a common plane and are separated from each other by cutouts or recesses 23 shown in FIG. 1. As will be explained in greater detail hereinafter, the units 2, 6 and 9 of the clutch plate 1 are angularly movable, within limits, relative to one another. The means for damping such movements comprises a main damping device including three larger coil springs 13 and three smaller coil springs 14 each of which is telescoped into one of the larger springs 13. The coil springs 13, 14 of the main damping device are disposed radially outwardly of the arms 12 and are preferably positioned in such a way that each pair of springs 13, 14 is disposed adjacent to and radially outwardly of a different one of the three arms 12 constituting the flange 8 of the hub 7. Portions of each pair of coil springs 13, 14 extend into registering windows 15, 16 of the disc members 3, 5 and registering windows 17, 18 of the intermediate discs 10, 11. It will be noted that the springs 13, 14 of the main damping device operate between the first and third units 2, 9. The energy storing capacity of the springs 13, 14 exceeds that of three smaller and weaker coil springs 19 which are disposed radially inwardly of the pairs of springs 13, 14 and together constitute the auxiliary or idling damping device of the improved clutch plate 1. Portions of the coil springs 19 are disposed in openings 20 of the arms 12 and in registering openings 21, 22 which are respectively provided in the intermediate discs 10, 11 of the third unit 9. Thus, the idling damping device operates between the second and third units 6, 9 of the clutch plate 1. The coil springs 19 of the idling damping device are equidistant from one another, as considered in the circumferential direction of the hub 7, and the same holds true for the three pairs of coil springs 13, 14 which together constitute the main damping device of the clutch plate.

Figure 2:
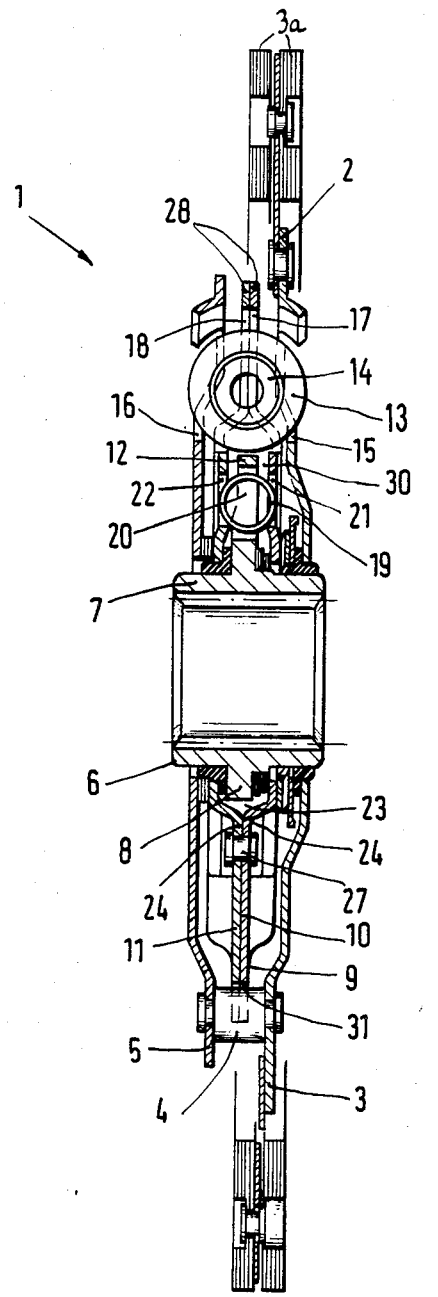
FIG. 2 is an axial sectional view as seen in the direction of arrows from the line II—II of FIG. 1.

The means for limiting the extent of angular movement of the third unit 9 relative to the second unit 6 and/or vice versa comprises projections 24 which are provided on the intermediate discs 10, 11 and extend axially of the hub 7. As can be seen in FIG. 2, the projections 24 of the intermediate disc 10 extend toward the projections 24 of the intermediate disc 11 and vice versa. Such projections extend, with angular play, into the aforementioned recesses or cutouts 23 between the arms 12 of the flange 8, and the projections 24 of the intermediate disc 10 abut against the registering projections 24 of the intermediate disc 11. Such projections are secured to each other by rivets 27 or other suitable connecting means. Each of the projections 24 preferably constitutes a suitably deformed portion of the respective intermediate disc, and each such projection has two edge faces 25, 25a which are respectively adjacent to edge faces 26, 26a of the arms 12 in the respective recesses 23. The edge faces 25 abut against the respective edge faces 26 when the intermediate discs 10, 11 are rotated in one direction with reference to the hub 7 (clockwise, as viewed in FIG. 1), and the edge faces 25a strike against the respective edge faces 26a if the intermediate discs 10, 11 are rotated in the opposite direction with reference to the hub 7 and/or vice versa. Thus, the edge faces 25, 25a and 26, 26a limit the extent of angular movement between the second unit 6 and the third unit 9.

The radially outermost marginal portions 28 of the intermediate discs 10 and 11 also extend axially of the hub 7 and toward each other. Such marginal portions 28 contact each other and are rigidly secured to one another by a set of rivets 29 or other suitable connecting means. The extent to which the projections 24 of the disc 10 or 11 are bent out of the general plane of the respective disc is preferably the same as the extent to which the marginal portions 28 are shifted toward each other. In other words, the projections 24 of each of the intermediate discs 10, 11 are coplanar with the respective marginal portion 28. In this manner, the intermediate discs 10, 11 define three pockets 30 each of which receives one of the arms 12.

The means for limiting the extent of angular movement between the first unit 2 and the third unit 9 of the improved clutch plate 1 comprises the aforementioned distancing elements 4 which extend with angular play into notches 31 machined into the peripheral surfaces (i.e., into the marginal portions 28) of the intermediate discs 10 and 11. As can be seen in FIG. 1, the intermediate discs 10, 11 have edge faces 31a and 31b which flank the respective notches 31 and serve as abutments for the respective distancing elements 4 to thereby limit the extent to which the discs 10, 11 can turn with reference to the disc members 3, 5 and/or vice versa.

An important advantage of the clutch plate 1 is that its weight is a fraction of the weight of equivalent conventional clutch plates. This is attributed to the aforediscussed design as well as to the aforediscussed assembly of component parts of the units 2, 6 and 9. The intermediate discs 10, 11 are simple parts made of sheet metal and connected to each other along their marginal portions 28. Also, the integral projections 24 of these intermediate discs cooperate with the arms 12 of the flange 8 to limit the extent of angular movement between the second and third units 6, 9. The arms 12 of the flange 8 are confined in the pockets 30 of the intermediate discs 10, 11 and the arms 12 are relatively short, as considered in the radial direction of the hub 7, so that they contribute little to the weight and bulk of the clutch plate. This renders it possible to install the springs 13, 14 of the main damping device radially outwardly of the arms 12 and to install the springs 19 of the idling damping device radially inwardly of the neighboring pairs of springs 13, 14. It has been found that the weight and the moment of inertia of the improved clutch plate are much more satisfactory than those of the heretofore known clutch plates. This is attributed to the fact that the entire third unit 9 merely consists of two simple and lightweight discs (10, 11) and that the aforediscussed second flange (which is needed in conventional clutch plates) can be omitted. The solid or bulky parts of the improved clutch plate 1 (namely, the hub 7 and the sections or arms 12 of the flange 8) are disposed close to the axis of the clutch plate, i.e., their radial dimensions are small which contributes to a pronounced reduction of the moment of inertia.

The number of arms 12 can be reduced to two or increased to four or more. However, it has been found that a flange 8 which has three equidistant arms 12 is especially satisfactory, not only in view of the simplicity of manufacture but also because such arms provide a sufficient number of recesses 23 for the projections 24 of the intermediate discs 10 and 11. The provision of relatively wide recesses 23 (as considered in the circumferential direction of the hub 7) contributes to a further reduction of the mass or weight of the heaviest component (6) or one of the two heavier components (2, 6). Uniform distribution of arms 12 (as considered in the circumferential direction of the hub 7) and identical dimensioning of the arms is desirable and advantageous because the clutch disc is perfectly balanced in all of its angular positions. In other words, the clutch plate is never out of balance. Uniform distribution of the pairs of coil springs 13, 14 and coil springs 19 (as considered in the circumferential direction of the hub 7) also contributes to the absence of unbalance when the clutch plate rotates.

The intermediate discs 10, 11 can be modified in a number of ways without departing from the spirit of the invention. For example, it can suffice to provide the projections 24 only on the intermediate disc 10 or only on the intermeidate disc 11. The projections 24 can constitute axially bent portions of the respective intermediate discs, or they may be formed by providing the intermediate discs with pairs of slots extending radially outwardly from the central openings of such discs and by bending the material between the pairs of slots in the axial direction of the hub. This is actually shown in the drawing, i.e., the edge faces 25, 25a have a width corresponding to the thickness of the respective intermediate discs. If the projections 24 are formed by deformation of the material of the respective intermediate discs without the making of radially extending slots, the width of the edge faces 25, 25a (as considered in the axial direction of the hub 7) can be much more pronounced. It is presently preferred to employ two mirror symmetrical intermediate discs, i.e., each of these discs is preferably provided with the same number of identical projections 24 which are rigidly secured to one another. Also, the marginal portion 28 of the disc 10 is preferably a mirror image of the marginal portion 28 of the disc 11. This enables the intermediate discs 10, 11 to at least partially confine the arms 12 of the flange 8. The use of two mirror symmetrical intermediate discs also contributes to lower cost of the clutch plate and to convenience of assembly of its constituents.

As can be seen in FIG. 1, the distancing elements 4 are preferably disposed radially outwardly of the projections 24 of the intermediate discs 10 and 11, i.e., each notch 31 is outwardly adjacent to a different pair of registering projections 24.

Figure 3:
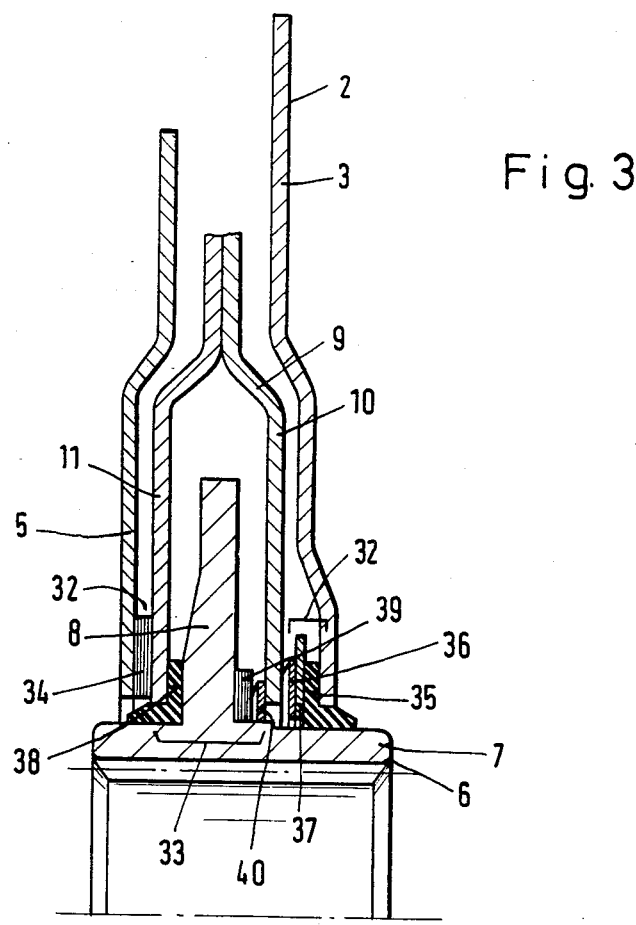
FIG. 3 is an enlarged fragmentary axial sectional view as seen in the direction of arrows from the line III—III of FIG. 1.

In order to enhance the damping action for torsional vibrations of the clutch plate 1, the latter further comprises a friction generating device 32 which is interposed between the units 2 and 9 as well as a friction generating device 33 which is interposed between the units 6 and 9 (see particularly FIG. 3).

The friction generating device 32 assists the main damping device including the coil springs 13, 14 and comprises a friction ring 34 which is interposed between the disc member 5 of the first unit 2 and the intermediate disc 11 of the third unit 9. The device 32 further comprises a second friction ring 35 having a substantially L-shaped cross-sectional outline and being interposed between the intermediate disc 10 of the third unit 9 and the disc member 3 of the first unit 2. The radially extending portion of the friction ring 35 is urged against the inner side of the disc member 3 by an undulate annular spring 36 which reacts against the intermediate disc 10 and bears against the friction ring 35 through the medium of an interposed washer 37. The axially extending portion of the friction ring 35 constitutes a bearing element for proper positioning of the third unit 9 with reference to the second unit 6, as considered in the radial direction of the hub 7. The axially extending portion of the friction ring 35 is in frictional engagement with the adjacent portion of the external surface of the hub 7. The annular spring 36 urges the disc member 3 of the first unit 2 axially of the hub 7 and away from the intermediate disc 10 whereby the friction ring 34 is automatically held in frictional engagement with the respective sides of the disc member 5 and intermediate disc 11.

The friction generating device 33 is interposed between the second unit 6 and the third unit 9 of the clutch plate 1. This device comprises a friction ring 38 which is preferably identical with the friction ring 35 (to thus reduce the initial cost of the clutch plate 1) and whose radially extending portion is installed between the sections 12 of the flange 8 on the one hand and the inner side of the intermediate disc 11 on the other hand. A second friction ring 39 of the friction generating device 33 is adjacent to and is biased against the right-hand sides of the arms 12 of the flange 8 (as viewed in FIG. 3) by an undulate annular spring 40 which reacts against the inner side of the intermediate disc 10 and bears against the right-hand side of the friction ring 39. The spring 40 causes the radially extending portion of the ring 38 to remain in frictional engagement with the adjacent surfaces of the arms 12 and intermediate ring 11. The axially extending portion of the friction ring 38 constitutes a bearing element which locates the third unit 9 with reference to the second unit 6, as considered in the radial direction of the hub 7.

The friction generating devices constitute an optional but desirable and advantageous feature of the improved clutch plate. The clutch plate can be provided with a single friction generating device (e.g., between the units 6 and 9), with two friction generating devices (between the units 2, 6 and 6, 9) or with three friction generating devices (between the units 2, 6, between the units 2, 9 and between the units 6, 9). The use of friction rings which simultaneously position certain parts, as considered in the radial direction of the hub 7 (note the rings 35 and 38), contributes to simplicity of the clutch plate because certain components of the friction generating devices can perform several functions, i.e., opposing rotation of certain parts with reference to one another as well as ensuring proper mounting of certain parts, as considered in the radial direction of the clutch plate. Moreover, such construction contributes to lower cost of the clutch plate because the ring 35 may be identical with the ring 38.

The mode of operation of the improved clutch plate 1 is as follows:

The arrow 41 denotes in FIG. 1 the direction of pull, namely, the direction in which the first unit 2 transmits torque to the second unit 6 when the first unit is driven by the flywheel on the crankshaft of an internal combustion engine. The arrow 42 indicates the direction in which the second unit 6 tends to drive the first unit 2 under certain circumstances, e.g., during coasting.

The characteristics of the coil springs 13, 14 which constitute the main damping device, and the manner of mounting these springs in the respective groups of windows 15 to 18, are selected in such a way that, starting from the idle position of the clutch plate 1 which is shown in FIG. 1, the first unit 2 and the third unit 9 rotate relative to the second unit 6 during the initial stage of angular displacement of the units 2, 9 with reference to the unit 6 irrespective of whether the angular displacement of the units 2, 9 takes place in a clockwise direction (arrow 42) or in a counterclockwise direction (arrow 41). Such angular displacements of the units 2, 9 relative to the unit 6 and/or vice versa entail deformation of the small and weak coil springs 19 which constitute the idling damping device of the clutch plate 1. Also, the friction generating device 33 between the units 6 and 9 is active at the same time by opposing angular displacement of the unit 9 with reference to the unit 6 and/or vice versa. The coil springs 13, 14 of the main damping device are stronger than the coil springs 19, or they are installed in the respective groups of windows 15 to 18 with a corresponding initial stress, so that they do not store energy in response to the just discussed angular displacement of the units 2, 9 with reference to the unit 6 and/or vice versa.

The springs 13, 14 of the main damping device become effective when the unit 2 completes (with reference to the unit 6) a movement through the angle 43 (in the direction of arrow 41) or 44 (in the direction of arrow 42). The springs 19 are then bypassed because the edge faces 25a of projections 24 of the intermediate discs 10, 11 abut against the edge faces 26a of the arms 12 (when the unit 9 is rotated through the angle 43 in the direction of arrow 41) so that the third unit 9 cannot continue to turn with reference to the second unit 6. In other words, from this moment on, the unit 2 can continue to turn relative to the unit 6 but such angular movement of the unit 2 is not shared by the unit 9. The just mentioned angular displacement of the unit 2 relative to the units 6 and 9 entails a deformation of the coil springs 13, 14, i.e., these springs store energy because the windows 15, 16 of the disc members 3, 5 move relative to the corresponding windows 17, 18 of the intermediate discs 10, 11 (which have ceased to rotate relative to the hub 7 and arms 12 of the second unit 6). If the units 2 and 9 are rotated in the direction of arrow 42, the edge faces 25 of the projections 24 come into abutment with the edge faces 26 of the arms 12 and thus prevent further angular displacement of the unit 9 with reference to the unit 6 as soon as the unit 9 completes an angular movement through the aforementioned angle 44. From then on, further angular displacement of the unit 2 in the direction of the arrow 42 takes place relative to the units 6, 9 and with attendant deformation of the coil springs 13, 14 forming part of the main damping device.

The maximum extent of angular displacement of the unit 2 with reference to the units 6 and 9 is determined by the distancing elements 4 in cooperation with the edge faces 31a, 31b in the notches 31 of the intermediate discs 10 and 11. Thus, when the unit 2 completes an angular movement through an angle 45 (in the direction of arrow 41) or an angle 46 (in the direction of arrow 42), the distancing elements come into abutment with the adjacent edge faces 31a or 31b and the angular movement of the unit 2 with reference to the units 6, 9 is terminated.

The friction rings 38 and 39 oppose the angular displacement of the first unit 2 from the starting position of FIG. 1 irrespective of whether the unit 2 is caused to turn clockwise (arrow 42) or counterclockwise (arrow 41). The friction rings 38 and 39 turn in synchronism while the unit 2 covers the angle 43 or 44. Such so-called idling friction is effective while the projections 24 of the intermediate discs 10, 11 of the third unit 9 are free to move with reference to the arms 12 of the flange 8, i.e., as long as the unit 9 is free to share the movements of the unit 2 with reference to the unit 6. As mentioned above, further angular movement of the unit 2 relative to the unit 6 takes place relative to the unit 9 because the latter is held against rotation with reference to the unit 6 as a result of engagement between the projections 24 and the arms 12. Such further angular movement of the unit 2 is terminated when the distancing elements 4 in the notches 31 strike against the respective edge faces 31a or 31b of the intermediate discs 10 and 11. The friction generating device 32 offers a pronounced resistance to angular movement of the unit 2 with reference to the units 6 and 9 by acting between the parts of the unit 2 and the parts of the unit 9 (which is then held against rotation with reference to the unit 6).

The axially extending portion of the friction ring 35 is effective during each and every stage of angular displacement of the unit 2 with reference to the unit 6. The maximum angular displacement of the unit 2 with reference to the unit 6 in the direction of arrow 41 equals the sum of angles 43, 45 and the maximum angular displacement of the unit 2 with reference to the unit 6 in the direction of arrow 42 equals the sum of angles 44, 46.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch plate, particularly for use in friction clutches of automotive vehicles, comprising a first unit including spaced-apart coaxial rigidly interconnected first and second disc members and friction linings provided on one of said disc members; a second unit including a hub having an external flange disposed between said disc members, said flange having at least one recess; a third unit including first and second metallic intermediate discs flanking said flange, disposed between said disc members non-rotatably connected to one another and having first portions extending radially outwardly well beyond said flange, the first portion of one of said intermediate discs abutting aginst the first portion of the other of said intermediate discs, said units being arranged to perform limited angular movements with reference to each other and at least one of said intermediate discs having at least one second portion extending with angular play into said recess to thus determine the extent of angular movability of said second and third units relative to each other; main damping means for yieldably opposing the angular movements of said first and third units with reference to one another, at least the major part of said main damping means being disposed radially outwardly of said flange, and said disc members as well as said intermediate discs having registering windows for said main damping means; and idling damping means for yieldably opposiing the angular movements of said second and third units with reference to one another, said flange and said intermediate discs having registering openings for said idling damping means.

2. The clutch plate of claim 1, wherein said flange comprises a plurality of arms extending radially outwardly of said hub.

3. The clutch plate of claim 2, wherein said flange comprises more than two equidistant arms.

4. The clutch plate of claim 2, wherein said arms are equidistant from one another, as considered in the circumferential direction of said hub.

5. The clutch plate of claim 4, wherein said arms are similar to one another.

6. The clutch plate of claim 2, wherein the openings of said flange for said idling damping means are provided in said arms.

7. The clutch plate of claim 2, wherein said flange has several recesses which alternate with said arms and said one intermediate disc has several second portions constituting projections and extending substantially axially and with play into the recesses between the arms of said flange to allow for said limited angular movements of the second and third units with reference to one another.

8. The clutch plate of claim 7, wherein said arms have edge faces flanking the projections of said one intermediate disc and said projections have edge faces abutting against the edge faces of the respective arms in response to angular displacement of the second and third units with reference to one another in the corresponding directions.

9. The clutch plate of claim 1, wherein at least a portion of said flange is confined between said intermediate discs.

10. The clutch plate of claim 1, further comprising means for connecting said first portions of said intermediate discs to each other.

11. The clutch plate of claim 10, wherein said connecting means comprises at least one rivet.

12. The clutch plate of claim 1, further comprising a friction generating device interposed between said second and third units.

13. The clutch plate of claim 12, wherein said friction generating device comprises at least one bearing element extending circumferentially of said hub and disposed between said second and third units.

14. The clutch plate of claim 1, further comprising a friction generating device interposed between said first and third units.

15. The clutch plate of claim 14, wherein said friction generating device comprises at least one bearing element extending circumferentially of said hub and disposed between said first and third units.

16. The clutch plate of claim 15, further comprising a second friction generating device interposed between said second and third units and comprising at least one bearing element extending circumferentially of said hub and disposed between said second and third units, the bearing element of said second friction generating device being identical with the bearing element of said first named friction generating device.

17. The clutch plate of claim 1, further comprising a friction generating device interposed between said first and second units.

18. The clutch plate of claim 1, wherein said first unit further comprises distancing elements extending between said disc members, said third unit having notches receiving said distancing elements with limited freedom of angular movement of said first and third units with reference to one another.

19. The clutch plate of claim 18, wherein said notches are provided in said intermediate discs and said intermediate discs have edge faces provided in said notches and moving into abutment with the respective distancing elements in response to angular displacement of said first and third units relative to one another.

20. A clutch plate, particularly for use in friction clutches of automotive vehicles, comprising a first unit including spaced-apart coaxial rigidly interconnected first and second disc members and friction linings provided on one of said disc members; a second unit including a hub having an external flange disposed between said disc members, said flange having several recesses and comprising a plurality of arms extending radially outwardly of said hub and alternating with said recesses; a third unit including first and second metallic intermediate discs flanking said flange, disposed between said disc members, non-rotatably connected to one another and having first portions extending radially outwardly well beyond said flange, said units being arranged to perform limited angular movements with reference to each other and each of said intermediate discs having several second portions constituting projections and extending substantially axially and with angular play into the recesses between the arms of said flange to thus determine the extent of said limited angular movability of said second and third units relative to each other; main damping means for yieldably opposing the angular movements of said first and third units with reference to one another, at least the major part of said main damping means being disposed radially outwardly of said flange, and said disc members as well as said intermediate discs having registering windows for said main damping means; and idling damping means for yieldably opposing the angular movements of said second and third units with reference to one another, said flange and said intermediate discs having registering openings for said idling damping means.

21. The clutch plate of claim 20, wherein the projections of said one intermediate disc register with the projections of the other of said intermediate discs, the projections of said one intermediate disc extending axially of the clutch plate toward the projections of said other intermediate disc and vice versa.

22. The clutch plate of claim 20, wherein the projections of said one intermediate disc register with the projections of the other of said intermediate discs, and further comprising means for connecting at least one projection of said one intermediate disc to the registering projection of said other intermediate disc.

23. The clutch plate of claim 22, wherein the projections of said one intermediate disc abut against the registering projections of said other intermediate disc.

24. A clutch plate, particularly for use in friction clutches of automotive vehicles, comprising a first unit including spaced-apart coaxial rigidly interconnected first and second disc members and friction linings provided on one of said disc members; a second unit including a hub having an external flange disposed between said disc members, said flange having at least one recess; a third unit including first and second metallic intermediate discs flanking said flange, disposed between said disc members, non-rotatably connected to one another and having first portions extending radially outwardly well beyond said flange as well as axially of the clutch plate and toward each other, said units being arranged to perform limited angular movements with reference to each other and at least one of said intermediate discs having at least one second portion extending with angular play into said recess to thus determine the extent of angular movability of said second and third units relative to each other; main damping means for yieldably opposing the angular movements of said first and third units with reference to one another, at least the major part of said main damping means being disposed radially outwardly of said flange, and said disc members as well as said intermediate discs having registering windows for said main damping means; and idling damping means for yieldably opposing the angular movements of said second and third units with reference to one another, said flange and said intermediate discs having registering openings for said idling damping means.

25. A clutch plate, particularly for use in friction clutches of automotive vehicles, comprising a first unit including spaced-apart coaxial rigidly interconnected first and second disc members and friction linings provided on one of said disc members; a second unit including a hub having an external flange disposed between said disc members, said flange having at least one recess; a third unit including first and second metallic intermediate discs flanking said flange, disposed between said disc members, non-rotatably connected to one another and having first portions extending radially outwardly well beyond said flange, said intermediate discs being mirror symmetrical to one another with reference to a plane extending at right angles to the axis of said hub and disposed between said intermediate discs, said units being arranged to perform limited angular movements with reference to each other and at least one of said intermediate discs having at least one second portion extending with angular play into said recess to thus determine the extent of angular movability of said second and third units relative to each other; main damping means for yieldably opposing the angular movements of said first and third units with reference to one another, at least the major part of said main damping means being disposed radially outwardly of said flange, and said disc members as well as said intermediate discs having registering windows for said main damping means; and idling damping means for yieldably opposing the angular movements of said second and third units with reference to one another, said flange and said intermediate discs having registering openings for said idling damping means.

26. A clutch plate, particularly for use in friction clutches of automotive vehicles, comprising a first unit including spaced-apart coaxial rigidly interconnected first and second disc members and friction linings provided on one of said disc members; a second unit including a hub having an external flange disposed between said disc members, said flange having a plurality of arms extending radially outwardly of said hub and a plurality of recesses alternating with said arms; a third unit including first and second metallic intermediate discs flanking said flange, disposed between said disc members, non-rotatably connected to one another and having first portions extending radially outwardly well beyond said flange, said intermediate discs defining pockets for said arms and said units being arranged to perform limited angular movements with reference to each other, at least one of said intermediate discs having several second portions constituting projections alternating with said pockets and extending with angular play into said recesses to thus determine the extent of angular movability of said second and third units relative to each other; main damping means for yieldably opposing the angular movements of said first and third units with reference to one another, at least the major part of said main damping means being disposed radially outwardly of said flange, and said disc members as well as said intermediate discs having registering windows for said main damping means; and idling damping means for yieldably opposing the angular movements of said second and third units with reference to one another, said flange and said intermediate discs having registering openings for said idling damping means.

27. A clutch plate, particularly for use in friction clutches of automotive vehicles, comprising a first unit including spaced-apart coaxial rigidly interconnected first and second disc members and friction linings provided on one of said disc members; a second unit including a hub having an external flange disposed between said disc members, said flange having at least one recess and more than two arms extending radially outwardly from said hub; a third unit including first and second metallic intermediate discs flanking said flange, disposed between said disc members, non-rotatably connected to one another and having first portions extending radially outwardly well beyond said flange, said units being arranged to perform limited angular movements with reference to each other and at least one of said intermediate discs having at least one second portion extending with angular play into said recess to thus determine the extent of angular movability of said second and third units relative to each other; main damping means for yieldably opposing the angular movements of said first and third units with reference to one another, at least the major part of said main damping means being disposed radially outwardly of said flange, and said disc member as well as said intermediate discs having registering windows for said main damping means, said main damping means comprising more than two coils springs and each of said coil springs being disposed radially outwardly of one of said arms; and idling damping means for yieldably opposing the angular movements of said second and third units with reference to one another, said flange and said intermediate discs having registering openings for said idling damping means.

28. The clutch plate of claim 27, wherein said main damping means comprises pairs of coil springs, each of said pairs being disposed radially outwardly of a different one of said arms.

29. The clutch plate of claim 28, wherein said pairs of springs are equidistant from one another, as considered in the circumferential direction of said hub.

30. A clutch plate, particularly for use in friction clutches of automotive vehicles, comprising a first unit including spaced-apart coaxial rigidly interconnected first and second disc members and friction linings provided on one of said disc members; a second unit including a hub having an external flange disposed between said disc members, said flange having at least one recess; a third unit including first and second metallic intermediate discs flanking said flange, disposed between said disc members, non-rotatably connected to one another and having first portions extending radially outwardly well beyond said flange, said units being arranged to perform limited angular movements with reference to each other and at least one of said intermediate discs having at least one second portion extending with angular play into said recess to thus determine the extent of angular movability of said second and third units relative to each other; main damping means for yieldably opposing the angular movements of said first and third units with reference to one another, at least the major part of said main damping means being disposed radially outwardly of said flange, and said disc members as well as said intermediate discs having registering windows for said main damping means; and idling damping means for yieldably opposing the angular movements of said second and third units with reference to one another, said flange and said intermediate discs having registering openings for said idling damping means and said idling damping means comprising more than two coil springs which are equidistant from one another in the circumferential direction of said hub.

31. The clutch plate of claim 30, wherein said main damping means comprises at least one additional coil spring for each coil spring of said idling damping means, said additional springs being disposed radially outwardly of the respective springs of said idling damping means.

32. The clutch plate of claim 31, wherein the energy storing capacity of said additional springs exceeds the energy storing capacity of the springs of said idling damping means.

33. The clutch plate of claim 32, wherein said main damping means comprises a pair of coil springs for each spring of said idling damping means, one coil spring of each pair being telescoped into the other coil spring of the respective pair.

* * * * *